Sept. 4, 1956 J. S. PIAJA 2,761,237
LINE HOLDING DEVICE FOR FISHING RODS
Filed Nov. 17, 1954
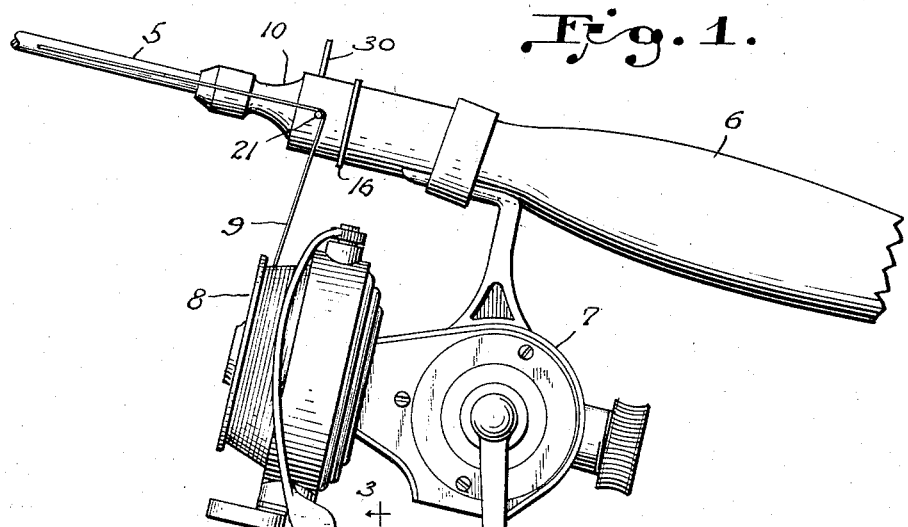
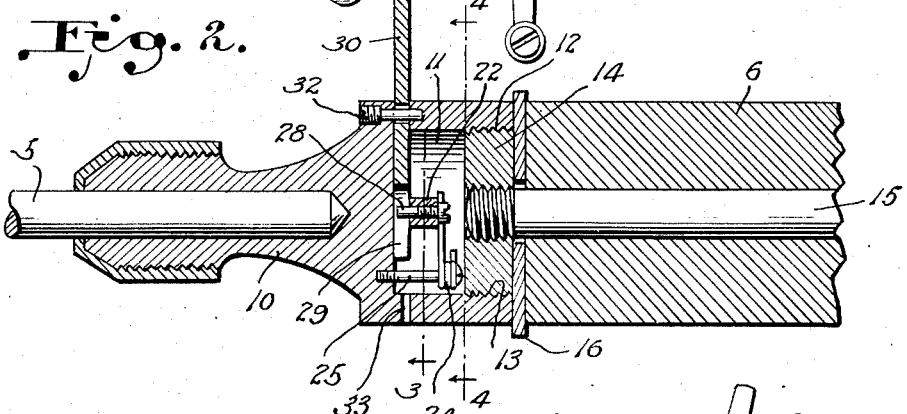
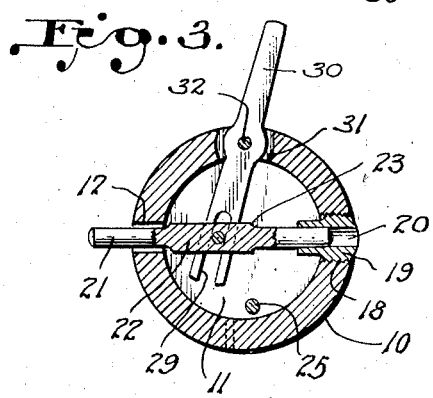
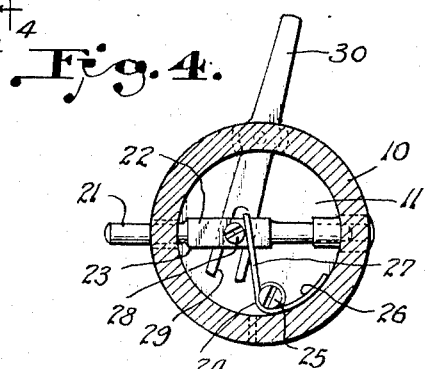
INVENTOR
Joseph Piaja
BY Ralph Burch
ATTORNEY 2,761,237

LINE HOLDING DEVICE FOR FISHING RODS

Joseph S. Piaja, Clifton, N. J.

Application November 17, 1954, Serial No. 469,499

5 Claims. (Cl. 43—25)

This invention relates to a line holding and release mechanism for fishing rods and more particularly to a device for releasably holding the line from a spinner reel at right angles to the axis of the reel while casting.

It is an object of the invention to provide means mounted in a fishing rod for holding the fishing line from a spinner type reel while casting and operable to release the line at the proper time to allow the line to unwind from the stationary spool of the reel.

A further object of the invention resides in mounting a retractable pin in a chamber formed in the fishing rod handle with means for projecting the pin laterally from the handle to support the fishing line in casting position and having manually actuated means on the handle for retracting the pin to release the line when casting.

Another object of the invention resides in providing a device of the above-mentioned character which is simple and durable in construction, reliable and efficient in operation and inexpensive to manufacture.

Other objects and advantages of the invention will be apparent during the course of the following specification.

In the accompanying drawing forming a part of this specification and in which like numerals are employed to designate like parts throughout the same, Fig. 1 is a fragmentary side elevational view of a fishing rod with a spinner type reel attached thereto showing my improved line holding means, Fig. 2 is a fragmentary longitudinal sectional view of the fishing rod handle showing the manner of mounting the line holding means therein, Fig. 3 is a cross section taken on line 3—3 of Fig. 2, and, Fig. 4 is a cross section taken on line 4—4 of Fig. 2.

In the drawing wherein for the purpose of illustration I have shown a preferred embodiment of the invention, the numeral 5 denotes a fishing rod having a handle 6 and attached to the handle is a conventional type of spinner reel 7 having a stationary spool 8 on which the fishing line 9 is wound. A section 10 supporting and connecting the rod 5 to the handle is provided in the end adjoining the handle with an annular chamber 11 having interior screw threads 12 for threaded engagement with the exterior threads 13 on a nut 14 threaded on the end of shaft 15 extending axially of the handle 6. A washer 16 on the shaft 15 establishes a tight fit between the section 10 and handle 6. The wall of chamber 11 is provided with diametrically opposed apertures 17 and 18, the aperture 18 being of larger diameter and threaded to receive a screw plug 19 having a bore 20 corresponding in diameter to that of the aperture 17. A plunger or pin 21 is slidably mounted in the aperture 17 and bore 20 of the plug and is adapted to be projected beyond the aperture 17 to extend laterally from the wall of the chamber above the axis of the spool 8 of the spinner reel. The central portion 22 of the pin is enlarged and is square in cross section with shoulders 23 at each end that limit the sliding movement of the pin in both directions. The pin 21 is normally moved in a direction to project beyond the aperture 17 by a coil spring 24 supported by a stud 25 secured in the bottom of the chamber 11. The end 26 of the spring bears against the wall of the chamber while the end 27 is in contact with the head of a bolt 28 extending through the central portion 22 of the pin 21. The free end of the bolt 28 projects from the central portion 22 and engages in the bifurcation 29 in the lower end of a lever 30. The lever 30 extends through a slot 31 in the wall of chamber 11 and is pivotally mounted in the slot by a pivot pin 32. The upper end of the lever projects beyond the wall of the chamber for engagement by the thumb of the hand holding the fishing rod. The wall of chamber 11 is provided with an opening 33 for drainage which may also be used for introducing a lubricant.

In operation, the line 9 from the spool 8 of the spinner reel is passed over the projecting pin 21 as shown in Fig. 1. When casting, the thumb of the hand holding the rod is placed against the lever 30 and when it is desired to release the line from the pin so that it can freely unwind from the reel, the lever is pressed by the thumb to swing the lever on its pivot and thus retract the pin. Upon releasing the thumb from the lever the spring 24 projects the pin outwardly and returns the lever to its normal position.

It is to be understood that the form of my invention herein shown and described is to be taken as a preferred example of the same and changes in the shape, size and arrangement of the parts may be made without departing from the spirit of the invention.

Having thus described my invention, I claim:

1. The combination with a fishing rod and spinner reel, of a chamber formed in said fishing rod, a line holding pin slidably mounted in said chamber adapted to project therefrom, means normally projecting said pin laterally from said chamber to support the portion of the line intermediate the reel and pin at right angles to the axis of the spinner reel, and means connected to said pin and projecting from said chamber for retracting said pin to release the line.

2. The combination with a fishing rod and spinner reel, of a chamber formed in the fishing rod, a line holding pin slidably mounted transversely of said chamber adapted to project laterally from said chamber to support the portion of the line intermediate the reel and pin at right angles to the axis of the spinner reel and means for retracting said pin to release the line.

3. The combination with a fishing rod and spinner reel, of a chamber formed in said fishing rod, a line holding pin slidably mounted in said chamber, a spring normally moving said pin to project one end laterally from said chamber to support the line from the reel, and a pivoted lever having one end connected with said pin and its opposite end projecting from said chamber for manual actuation to retract said pin and release the line.

4. The combination with a fishing rod and spinner reel, of a line holder mounted on said rod transversely thereof and adapted to project laterally from said rod at right angles to the axis of the spinner reel, and means for retracting said line holder to release the line.

5. A device as described in claim 4 including means for projecting said line holder laterally from said rod.

References Cited in the file of this patent

UNITED STATES PATENTS

| 379,683 | Coates | Mar. 20, 1888 |
| 2,646,640 | George | July 28, 1953 |
| 2,648,505 | Mouborgne | Aug. 11, 1953 |

FOREIGN PATENTS

| 53,656 | France | July 11, 1946 |
| 878,579 | Germany | June 5, 1953 |
| 899,878 | Germany | Dec. 17, 1953 |